July 1, 1969
N. R. BUCK ET AL
3,453,169
ENCAPSULATOR
Filed Oct. 23, 1965
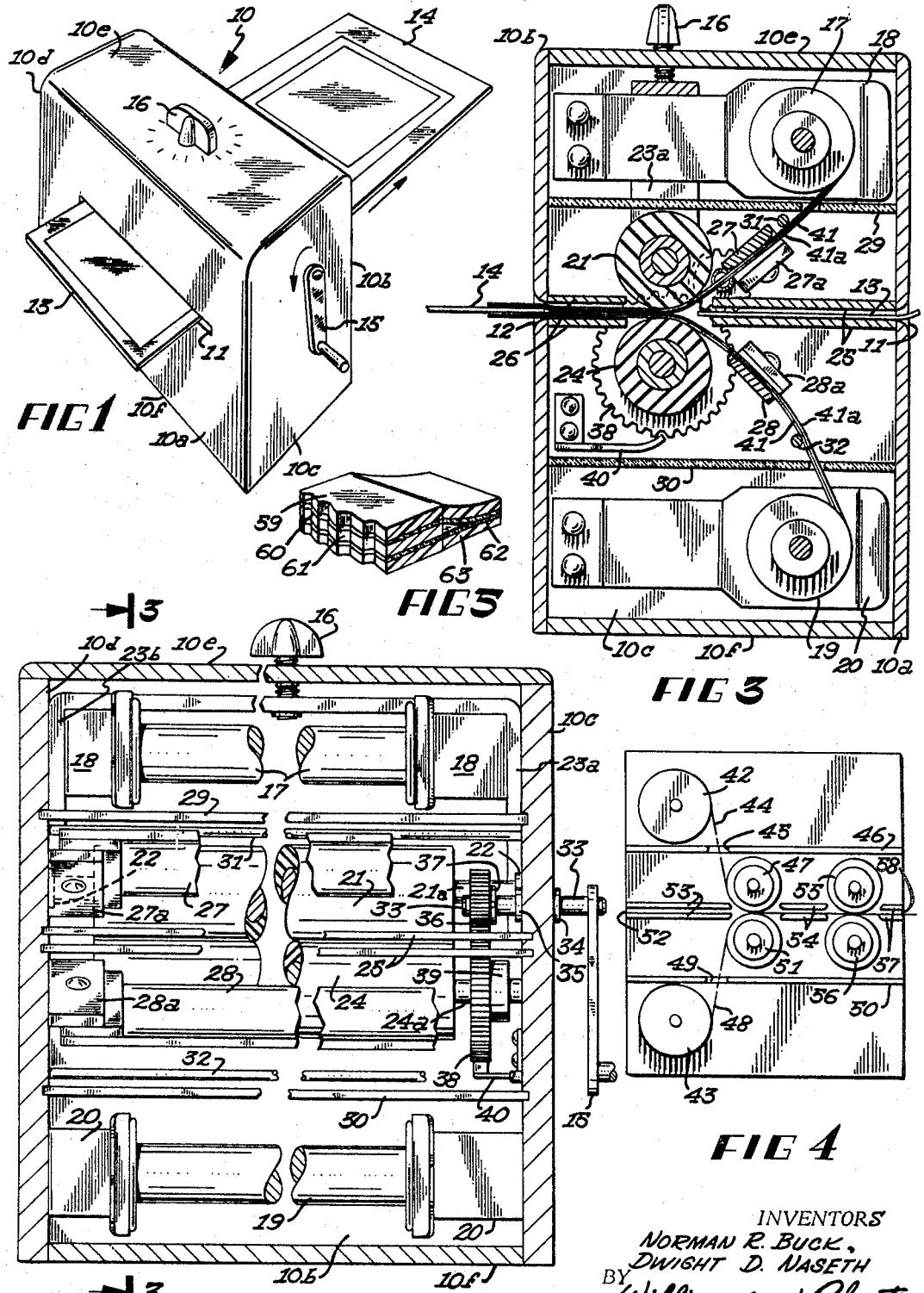
INVENTORS
NORMAN R. BUCK,
DWIGHT D. NASETH
BY Williamson & Palmatier
ATTORNEYS United States Patent Office 3,453,169
Patented July 1, 1969

3,453,169
ENCAPSULATOR
Norman R. Buck, Northfield, and Dwight D. Naseth, Faribault, Minn., assignors to N. R. Buck Co., Inc., a corporation of Minnesota
Filed Oct. 23, 1965, Ser. No. 503,217
Int. Cl. B31b *21/60;* B65d *75/30*
U.S. Cl. 156—552     4 Claims

ABSTRACT OF THE DISCLOSURE

Apparatus encapsulating cards or photographs between confronting and enclosing laminae of plastic transparent film which are adhered together.

---

This invention relates to a device for laminating a relatively thin plastic film to a substrate, and more particularly relates to a device for encapsulating a substantially flat material between two strips of plastic film.

In order to preserve an item such as a driver's license, identification card, certified check or photograph, it is oftentimes desirable to laminate the item to be preserved in a plastic film such as polyethylene terephthalate, commonly called Mylar. Either of two methods may be used to preserve and protect a card. Mylar, or any of several suitable plastic films, may be laminated to one surface of the card. The film typically has an adhesive coated on one side, which adhesive is activated immediately prior to securing the card thereto. Encapsulation, on the other hand, completely surrounds the card, forming a protective cocoon. The card is placed between two layers of film with activated adhesive layers and secured therebetween. Surrounding the card is a border of top and bottom film layers adhered to each other, completely sealing the card from harm and giving considerably more strength to the card.

Heretofore commercial laminators or encapsulators have been the only means available for laminating or encapsulating any of the aforementioned items. These laminators, or encapsulators, because of their very high cost and complex operating and control requirements are not typically available to an individual or a small businessman.

With these comments in mind it is to the elimination of these and other disadvantages to which the present invention is directed along with the inclusion therein of other novel and desirable features.

An object of our invention is to provide a new and improved encapsulator of simple and inexpensive construction and operation.

Another object of our invention is to provide an encapsulator which produces a high quality laminate, or encapsulated member, with a minimum of skill.

A further object of our invention is the provision of an encapsulator with a minimum of controls and adjustments which must be manipulated by the operator to produce a satisfactory encapsulated member.

These and other objects and advantages of our invention will more fully appear from the following description made in connection with the accompanying drawings wherein like reference characters refer to the same or similar parts throughout the several views, and in which:

FIG. 1 is an isometric view showing our encapsulator with an item to be encapsulated at the inlet slot and an encapsulated item at the outlet slot.

FIG. 2 is an enlarged front elevation section view of our encapsulator.

FIG. 3 is a side elevation section view taken along the line 3—3 of FIG. 2.

FIG. 4 is a diagrammatic arrangement of a modified form of our invention.

FIG. 5 is a diagrammatic section view of a portion of an encapsulated item.

The encapsulator of our invention is shown in FIG. 1, and comprises a housing, indicated in general by numeral 10. The housing is typically constructed of a rigid material, such as aluminum, and is designed specifically to maintain a high temperature level within the housing and specifically at the area of contact of the pressure rolls. The housing consists of front and rear walls 10a and 10b respectively, side walls 10c and 10d respectively and top and bottom panels 10e and 10f. The side panels are typically ¼-inch thick aluminum plate, milled and drilled to facilitate the assembly of the various working parts of our encapsulator. The remaining panels may be constructed of an aluminum plate having a thickness somewhat less than ¼ inch. The housing walls should be assembled in relatively tight-fitting relation to prevent undue heat loss. Typically, the side panels 10c and 10d are used as base panels with the remaining panels screwed thereto.

A transverse inlet slot 11 is provided in front wall 10a for receiving a card to be encapsulated. A transverse outlet slot 12 is provided in rear wall 10b, substantially in line with inlet slot 11. The encapsulated card is ejected from slot 12. FIG. 1 shows a card 13 entering slot 11, and an encapsulated card 14 being ejected from outlet slot 12. A manual crank 15 is provided for advancing the card from the inlet 11 to the outlet 12. A roll pressure adjusting knob 16 is indicated on top panel 10e.

In FIG. 2, an upper Mylar supply cartridge roll 17 is shown. A pair of spring clips 18 are shown holding cartridge roll 17 in place for rotation therebetween along a transverse axis. A lower Mylar cartridge supply roll 19 is shown disposed between spring clips 20 for transverse axial rotation therebetween. Spring clips 18 and 20 are typically formed of 20 gauge spring steel and are affixed to side walls 10c and 10d respectively. The spring clips must place sufficient drag on the supply rolls 17 and 19 to maintain the plastic film relatively taut. If too little drag is placed on cartridge 17 and 19, the film is loose as it passes between the pressure rolls and wrinkles occur on the finished product. On the other hand, if too much drag is placed on cartridges 17 and 19 it is difficult to feed material through the encapsulator. An upper pressure, or nip, roll 21 is mounted in housing 10 with a transverse axis of rotation parallel to the axis of rotation of supply spools 17 and 19. The upper pressure roll 21 is typically formed from a cold rolled steel shaft of ¾-inch diameter with a covering of approximately ⅛-inch thick. 60–80 durometer natural rubber cover. Release roll shaft 21a extends from each end of release roll 21, and projects into bushings 22, which are mounted in side walls 10c and 10d with provision for slidable, longituidnal movement. A cross-bracket 23, having legs 23a and 23b is disposed within housing 10 for slidable, longitudinal movement therein. Legs 23a and 23b contact bushings 22 at the ends of legs 23a and 23b respectively. Adjusting knob 16 actuates bracket 23, which in turn forces legs 23a and 23b upwardly or downwardly allowing roll 21, which is mounted in bushings 22, to be placed at a predetermined longitudinal position.

A drive roll 24 is mounted in housing 10 below roll 21, and in tangential face contact therewith. Drive roll 24 is also formed from a ¾-inch diameter cold rolled shaft with a ⅛-inch thick, 60–80 durometer natural rubber covering. The axis of rotation of drive roll 24 is transverse and parallel to the axis of rotation of upper roll 21. Drive shafts 24a project from each end of drive roll 24 and are rotatably mounted in side walls 10c and 10d respectively. Upper roll 21 and lower drive roll 24 are mating pressure, or nip, rolls having an area of contact along their tangential line of contact. Since each roll has a resilient rubber covering this pressure zone may be increased in area by simply adjusting knob 16, forcing upper roll 21 to a lower longitudinal position. This pressure zone adjustment is of particular importance in encapsulating in that the film must be secured to both the card, in the middle of the film, and the upper film to the lower film along the peripheral border of the encapsulated card. The encapsulated card, of course, has a greater thickness at points of contact of film to the card than is the thickness along the peripheral border edges where the card is not present. To successfully encapsulate the card a seal must be obtained along the border edges, which seal is readily accomplished with the mating, resilient pressure rolls.

Also shown in FIG. 2 is a pair of closely spaced, parallel material slide-in plates 25. The plates are typically formed from 16 gauge aluminum and are mounted in housing side walls 10c and 10d respectively, in close proximity to the tangential line of contact of mating rolls 21 and 24. It is important that the slide-in plates 25 be disposed immediately adjacent the tangential pressure zone of the nip rolls. This facilitates guiding the card into the pressure zone. The slide-in plates may be heated in any of several conventional ways to facilitate bonding the film to the card. The heat from the hot slide-in plates is transmitted to the card just prior to contact with the film and aids in maintaining a predetermined adhesive temperature level at the precise point of contact of adhesive to substrate. Additionally, the chance of creating air pockets between the card and plastic film is greatly decreased with the slide-in plates disposed as close as possible to the pressure zone of the nip rolls.

A pair of closely spaced, parallel slide-out plates 26 are shown in FIG. 3. These plates are in close proximity to the pressure zone of contact of rolls 21 and 24 to receive material which has been encapsulated, and direct the material through outlet slot 12. Slide-out plates 26 are typically 16 gauge aluminum, and are transversely mounted in housing walls 10c and 10d respectively.

An upper heating bar 27, shown in FIG. 2, is disposed transversely of housing 10, parallel with the pressure zone of nip rolls 21 and 24, and mounted on side walls 10c and 10d. Mounting brackets 27a are shown at each end of upper heat element 27 securing the heat element to the housing side walls. A lower heating bar 28 is shown mounted on walls 10c and 10d, utilizing mounting brackets 28a, and locating heating bar 28 parallel with the pressure zone of rolls 21 and 24. Heating bars 27 and 28, are typically wire wound resistors covered with porcelain which in turn is covered with an aluminum fabric for contact with the plastic film. The surface of the heating bars which contact the film is curved to decrease the frictional force on the film as it passes in contact with the heating bars. The heat output of the heating bars is controlled by the number of windings. Additional control may be obtained by interposing a conventional preset thermostat in the heating bar energizing circuit. An upper heat shield 29 and a lower heat shield 30 separate Mylar spools 17 and 19 from heating bars 27 and 28 respectively, and create an isolated high temperature area surrounding the pressure rolls and slide-in plates. Shields 29 and 30 are typically formed from 1/16-inch thick asbestos and are attached to side walls 10c and 10d. Each shield includes a slot for threading the film from the cartridge to the nip rolls.

An upper idler roller 31 and a lower idler roller 32 are rotatably mounted in side walls 10c and 10d. The idler rollers are positioned parallel to the pressure zone of nip rolls 21 and 24 and between the heating bars and the plastic film supply spools. The upper and lower idler rollers are of particular importance in that they maintain a constant angle of attack of film over the heating bars. As the film unwinds from the cartridge spools, the film assumes a position closer to the core of the cartridge spool. Without the idler rollers, the film would progressively contact more of the curved surface of the heating bars as it unwound. This would result in shrinkage of the film if too much tension, as well as additional heat, was experienced by the film immediately prior to passing between the mating nip rolls. The idler rollers are typically formed from 1/8-inch diameter steel rods.

The manual drive assembly is shown in FIG. 2 and includes a drive shaft 33 attached to crank 15 and projecting through housing side wall 10c. Shaft 33 rotates within bushings 34 and 35 which are mounted in side wall 10c. The rotational movement of crank 15 is transmitted through shaft 33 to gear 36 which is secured to shaft 33 by retaining collar 37. Gear 36 is in meshing contact with gear 38 which is mounted on shaft 24a which extends axially from lower pressure drive roll 24. Retaining collar 39 secures gear 38 in position on shaft 24a. Gears 36 and 38 are typically formed from nylon and are standard spur gears. Typically, the ratio of the driven gear 38 to the drive gear 36 is 2/1, and was selected to effect a uniform progression of plastic film through the pressure zone of rolls 21 and 24.

A one way locking spring 40 is secured to side wall 10c in locking relation with gear 38. Locking spring 40 allows rotation of gear 38 in the forward direction but prohibits movement in the reverse direction. This is of particular importance since slight movement of the nip rolls in the reverse direction may result in up to several feet of transverse wrinkles in the plastic film as the film passes through the pressure zone of the mating rolls. The locking spring 40 prevents this reverse rotation and therefore prevents the number of times which the housing must be dismantled in order to re-thread the plastic film through the pressure zone. The locking spring is typically formed from 20 gauge spring steel.

Referring to FIG. 5, a finished portion of an encapsulated card is shown. The upper Mylar film is indicated by numeral 59 and includes an adhesive layer indicated at 60. A card 61 is sandwiched between the upper Mylar layer and the lower film which has an adhesive 62 in contact with card 61 and then an outer surface of Mylar 63 from the lower supply spool. It should be noted that the Mylar films 59 and 63 are in contact with each other along the borders of the card 61, thereby completely encapsulating the card. In lamination, of course, only one layer of plastic film is used.

The manner in which an encapsulated card is produced using our invention is best described by referring to FIG. 3. Upper and lower supply rolls 17 and 19 have plastic film wound thereon, which is indicated in general by numeral 41. Film 41 includes, typically a polyester adhesive which is indicated at numeral 41. Film from the upper supply spool is threaded through the slot in heat shield 29, and into contact with roller 31. The film side which does not have adhesive 41a thereon contacts roller 31 and then passes over the curved surface of heating bar 27. Heating bar 27 actuates adhesive 41a at a point as close to the pressure zone of mating rolls 21 and 24 as possible. The heat from the heating bar is transmitted through the Mylar film 41 to the adhesive layer 41a. Simultaneously, film from the lower supply spool 19 is threaded through the slot in heat shield 30, into contact with roller 32 and then over the curved surface of heating bar 28.

A card is then inserted between slide-in plates 25, which may or may not be heated, for discharge at the pressure zone of mating rolls 21 and 24. Pressure rolls 21 and 24 secure the upper and lower film layers to the upper and lower surface of the card as well as secure the peripheral boundary layers of upper film to lower film, completely encapsulating the card. The card is advanced to the pressure rolls and outer of the housing by simply turning crank 15. Crank 15 should be turned at a relatively constant rate of speed for best results.

To achieve quality encapsulation, three variables must be carefully considered. They are, firstly pressure at the pressure zone of the nip rolls, secondly temperature at thet heating bar and thirdly the dwell time of the item to be encapsulated between the nip rolls. Pressure at the nip rolls may be adjusted, by simply turning nut 16 which imparts longitudinal movement to bracket 23. This movement is transmitted to pressure roll 21 and changes the longitudinal position of pressure roll 21, determining the force exerted at the pressure zone of mating rolls 21 and 24. The housing of our encapsulator is completely enclosed to aid in maintenance of a constant high temperature within the housing. The heating bar has a predetermined number of windings in order to give relatively constant heat. In some instances, it is desirable to provide a thermostatic control in the heating bar energizing circuit. Additionally, a conventional variable heat control dial may be interposed in the heating bar energizing circuit. Dwell time is determined by the rate of rotation of the manual crank. The operator will quickly recognize, that approximately one revolution per second of crank 15 gives satisfactory results. Each of the above mentioned variables, pressure, temperature and dwell time, may be readily adjusted to suit other plastic films.

A modified form of our invention is shown in FIG. 4. An upper plastic film supply roll is indicated by numeral 42, and a lower film supply roll by numeral 43. Film 44 is threaded through a slot 45 in heat shield 46, into face contact with heat roller 47. Film 48, from supply roll 43, is threaded through slot 49 in heat shield 50, into face contact with heat roll 51. Material to be encapsulated is inserted at inlet 52, between material slide-in plates 53, which discharge the material to be encapsulated into rolls 47 and 51, which are in tangential contact in close proximity to the discharge of material slide-in plates 53. The material to be encapsulated is sandwiched between film 44 and film 48 and next proceeds through closely spaced parallel guide plates 54 into pressure nip rolls 55 and 56. Manual power input may be provided to roll 56 which is typically a rubber covered roll. The material which has been encapsulated then proceeds through material slide-out plates 57 and through the outlet 58.

It will, of course, be understood that various changes may be made in the form, details, arrangement and proportions of the various parts without departing from the scope of our invention.

What is claimed is:

1. A compact portable device for encapsulating a substantially flat object between an upper and a lower plastic film, said device comprising
   a housing having an inlet for material to be encapsulated and an outlet for encapsulated material, said housing providing an enclosure whereby a predetermined temperature level may be maintained within said housing,
   upper and lower plastic film supply spools mounted in said housing for rotational movement therein, means retarding rotation of said spool whereby the film is maintained relatively taut as it unwinds from said spools,
   a pair of mating pressure rolls mounted in said housing for rotational movement therein and adapted to receive film from each of said supply spools between said rolls, each of said mating pressure rolls having a resilient cover providing a pressure zone between said rolls,
   an upper heating bar mounted in said housing parallel to said upper supply spool and said mating pressure rolls, said upper heating bar interposed between said upper supply spool and said mating rolls and adapted to contact film dispensed from said upper supply spool,
   a lower heating bar mounted in said housing parallel to said lower supply spool and said mating pressure rolls, said heating bar interposed between said lower supply spool and said pressure rolls and adapted to contact film dispensed from said lower supply spool,
   a material inlet guide mounted in said housing adjacent said housing inlet, said inlet guide adapted to orient material to be encapsulated and direct the material into the pressure zone of said mating rolls,
   said material inlet guide comprising a heating bar whereby material to be encapsulated is preheated immediately prior to being dispensed into the pressure zone of said pair of mating rolls, and
   means rotating said pressure rolls whereby encapsulated material is dispensed from said rolls to the outlet of the housing.

2. A compact, portable device for encapsulating a substantially flat object between an upper and lower plastic film, said device comprising,
   a housing having an inlet for material to be encapsulated and an outlet for encapsulated material, said housing providing an encloseure whereby a predetermined temperature level may be maintained within said housing,
   a pair of upper and lower supply spool receiving clips mounted in said housing,
   upper and lower plastic film supply spools mounted in said upper and lower clips for rotational movement therein, the rotation of said upper and lower plastic film supply spools restricted by the frictional force of said mouting clips against the spool ends whereby the film is maintained relatively taut as it unwinds from said spools,
   a pair of mating pressure rolls mounted in said housing for rotational movement therein and adapted to receive film from each of said supply spools between said rolls, each of said mating pressure rolls having a resilient cover providing a pressure zone between said rolls,
   an upper heating bar mounted in said housing parallel to said upper supply spool and said mating pressure rolls, said upper heating bar interposed between said upper supply spool and said mating rolls and adapted to contact film dispensed from said upper supply spool,
   a lower heating bar mounted in said housing parallel to said lower supply spool and said mating pressure rolls, said heating bar interposed between said lower supply spool and said pressure rolls and adapted to contact film dispensed from said lower supply spool,
   means energizing said upper and lower heating bars,
   an upper heat shield mounted in said housing interposed between said upper supply spool and said upper heating bar,
   a lower heat shield mounted in said housing interposed between said lower supply spool and said lower heating bar, said upper and lower heat shields, defining a high temperature area surrounding said pair of mating pressure rolls and isolated from said upper and lower film supply spools,
   a material inlet guide mounted in said housing adjacent said housing inlet, said inlet guide adapted to orient material to be encapsulated and direct the material into the pressure zone of said mating rolls,
   manually operated gear means rotating one of said mating pressure roll whereby encapsulated material is dispensed from said pressure rolls to the outlet of said housing, and
   a gear locking spring attached to said housing and in contact with said gear assembly whereby rotation of said gear assembly is allowed in forward direction only, thereby preventing reverse movement damaging film in the pressure zone of said mating rolls.

3. A compact, portable device for encapsulating a substantially flat object between an upper and lower plastic film, said device comprising,
   a housing having an inlet for material to be encapsulated and an outlet for encapsulated material, said housing providing an enclosure whereby a predetermined temperature level may be maintained within said housing, upper and lower plastic film supply spools mounted in said housing for rotational movement therein, the rotation of said upper and lower plastic film supply spools restricted by frictional force of spool mounting clips against spool ends whereby the film is maintained relatively taut as it unwinds from said spools, a pair of mating pressure rolls mounted in said housing for rotational movement therein and adapted to receive film from each of said supply spools between said rolls, each of said mating pressure rolls having a resilient cover providing a pressure zone between said rolls, means adjusting the pressure zone between said pair of mating pressure rolls, an upper heat shield mounted in said housing interposed between said upper supply spool and said pair of mating pressure rolls, a lower heat shield mounted in said housing interposed between said lower supply spool and said pair of mating pressure rolls, said upper and lower heat shields, defining a high temperature area surrounding said pair of mating pressure rolls and isolated from said upper and lower film supply spools, means supplying heat to the isolated high temperature area defined by said housing and said upper and lower heat shields, a material inlet guide mounted in said housing adjacent said housing inlet, said inlet guide adapted to orient material to be encapsulated and direct the material into the pressure zone of said mating rolls, and means rotating said pressure rolls whereby encapsulated material is dispensed from said rolls to the outlet of said housing.

4. A compact portable device for encapsulating a substantially flat object between an upper and lower plastic film, said device comprising a housing having an inlet for the object to be encapsulated and an outlet for the encapsulated object, said housing providing an enclosure whereby a predetermined temperature level may be maintained within the housing, upper and lower plastic film supply spools mounted in said housing for rotational movement therein, means retarding rotation of said spools whereby film is maintained relatively taut as it unwinds from said spools, a pair of mating pressure rolls mounted in said housing for rotational movement therein and adapted to receive film from each of said supply spools between said rolls, an upper heating bar mounted in said housing along the film extending between said upper supply spool and the mating pressure rolls for heating the film from the upper supply spool, a lower heating bar mounted in said housing along the film extending between said lower supply spool and said mating pressure rolls for heating the film, an elongate guide mounted within the heated enclosure of said housing and extending from the housing inlet toward the mating pressure rolls, the guide being heated by one of said heating bars to effect preheating of the object inserted and moved thereover toward the mating pressure rolls, and means rotating said pressure rolls whereby the encapsulated object is dispensed from said rolls to the outlet of the housing.

References Cited
UNITED STATES PATENTS

| | | | |
|---|---|---|---|
| 2,722,735 | 11/1955 | Beamish | 156—555 |
| 2,944,587 | 7/1960 | Newcomb | 156—550 |
| 3,027,285 | 3/1962 | Eisner et al. | 156—552 |
| 3,309,983 | 3/1967 | Dresser | 156—555 |

DOUGLAS J. DRUMMOND, *Primary Examiner.*

U.S. Cl. X.R.

156—555